United States Patent Office 3,479,826
Patented Nov. 25, 1969

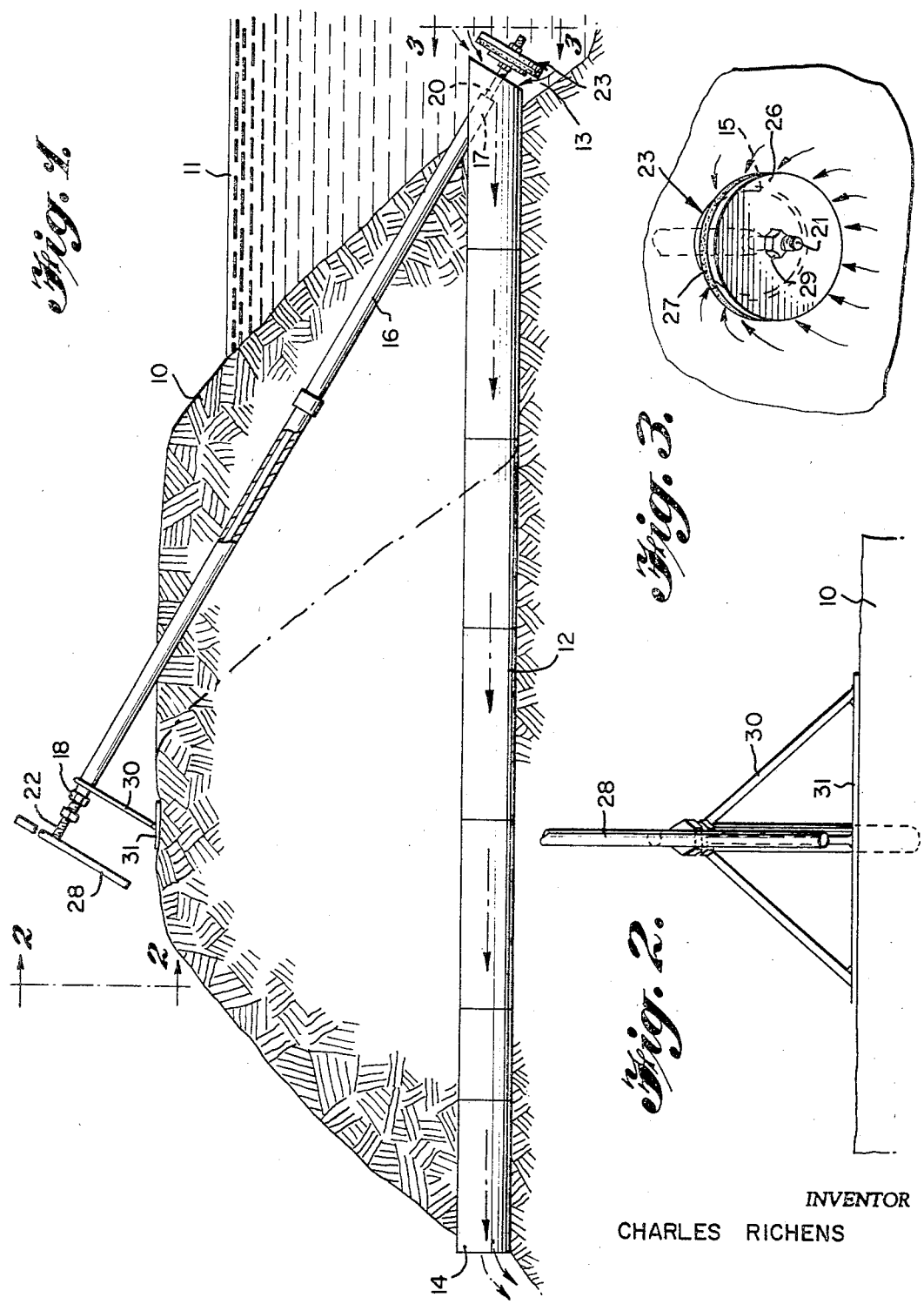

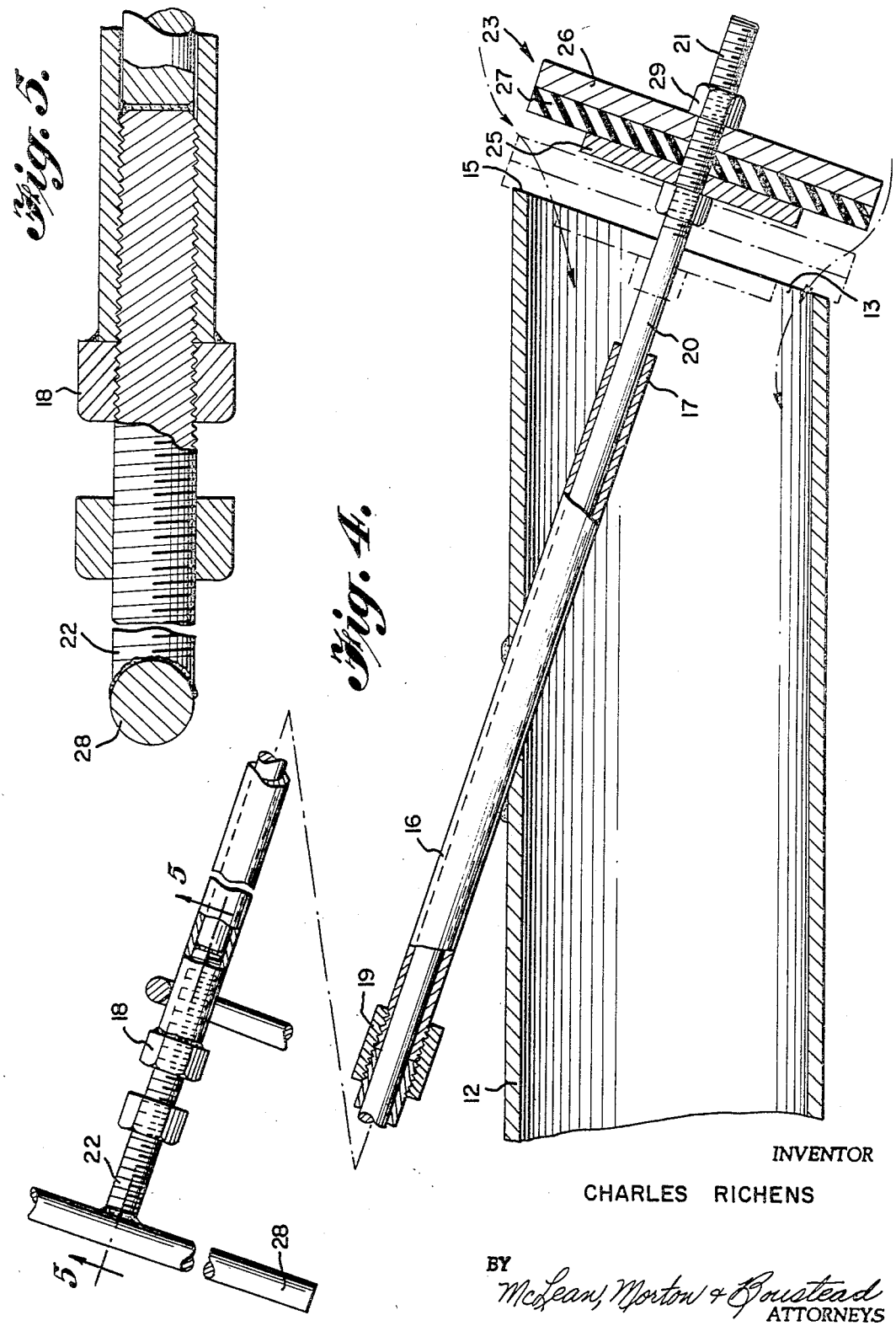

3,479,826
IRRIGATION VALVE
Charles Richens, Roosevelt, Utah 84066
Filed May 3, 1968, Ser. No. 726,325
Int. Cl. E02b 8/04; F16k 31/46
U.S. Cl. 61—22
1 Claim

ABSTRACT OF THE DISCLOSURE

An irrigation valve angularly mounted at the inlet end of a stand pipe and controlled by a stem running to a handle above the dam.

---

This invention is directed to improvements in irrigation valves. Prior hereto gate valves have been used on the inlet end of discharge pipes as irrigation valves. One type has associated therewith a wooden ramp so the farmer may operate the handle extended above the inlet. Another type has the inlet end of discharge pipe angled upwardly so the stem of gate valve will extend, not vertically, but diagonally over the dam.

Accordingly it is an object of this invention to produce a simpler more reliable irrigation valve.

The invention will be further described with reference to the attached drawing wherein:

FIG. 1 is a partial section of the invention;
FIG. 2 is a side view taken on lines 2—2 of FIG. 1;
FIG. 3 is a side view taken on lines 3—3 of FIG. 1;
FIG. 4 is an enlarged partial section of the invention;
FIG. 5 is a partial section taken on lines 5—5 of FIG. 4.

An earth irrigation dam 10 across a stream bed or other suitable location allows water 11 to build up to the level shown. Discharge pipe 12 extends through the dam and contains inlet 13 and outlet 14.

Inlet 13 terminates in an end 15 which has a polished face and serves as a valve seat. The end 15 is cut to have its surface in a plane at a slight angle to the vertical and opening downwardly.

Protruding through discharge pipe 12 near inlet 13 is pipe housing 16. This housing is normal to the plane of the end opening and its lower end 17 terminates near thereto. The upper end terminates with threaded nut 18. For convenience, the housing may be of short lengths connected by coupling 19.

Passing through housing 16 is valve stem 20 which is threaded at its ends 21, 22. On the lower end 21 is mounted valve face 23 comprising threaded nuts 24, small steel washer 25, large steel washer and backing plate 26 and rubber gasket 27, or other gasket material.

At the top of the stem threaded section 22 cooperates with nut 18 to move the stem linearly as the stem is rotated by handle 28. Also on stem portion 22 is stop nut 29.

Holding the upper end of the housing 16 in place is bracket 30 which rests on plate 31 on top of the dam.

The valve may be operated from on top the dam. When the valve is shut, the stem and housing are isolated from water, this preventing their freezing during the winter.

The foregoing describes one specific embodiment of my invention. Variations of this embodiment, but coming within the scope of my invention, will be immediately apparent to those skilled in the art. I do not intend to be limited to the foregoing, but only by the appended claim.

Having thus described my invention as required by law, what I claim and desire to secure by Letters Patent is:

1. In a valve for a discharge pipe in an irrigation dam, the improvement comprising a valve seat at the inlet end of the stand pipe, said valve seat being at an acute angle to the vertical and facing downwardly, cooperating with the valve seat, a valve face plate operated by a valve stem extending upwardly through the discharge pipe, normally to the plane of the valve seat and an acute angle to the horizontal and ending at a point on top of the dam, a handle attached to the end of the valve stem, whereby the handle causes the valve to open or shut.

References Cited

UNITED STATES PATENTS

| 261,021 | 7/1882 | Miller | 251—339 X |
| 416,247 | 12/1889 | Ackermann | 61—12 |
| 572,842 | 12/1896 | Towne | 61—12 |
| 778,323 | 12/1904 | Martin | 61—12 |
| 796,590 | 8/1905 | Martin | 61—12 |
| 1,028,599 | 6/1912 | Parker | 285—8 X |
| 1,463,093 | 7/1923 | Pearson | 251—339 X |

PETER M. CAUN, Primary Examiner

U.S. Cl. X.R.
251—319, 339